(12) United States Patent
Kumar Kasturi et al.

(10) Patent No.: US 10,701,154 B2
(45) Date of Patent: Jun. 30, 2020

(54) SHARDING OVER MULTI-LINK DATA CHANNELS

(71) Applicant: Microsoft Technology Licensing, LLC, Redmond, WA (US)

(72) Inventors: Sri Sai Kameswara Pavan Kumar Kasturi, Redmond, WA (US); Baskar Sridharan, Sammamish, WA (US); Spiro Michaylov, Redmond, WA (US); Joseph M. Gagne, Bellevue, WA (US); Raghunath Ramakrishnan, Bellevue, WA (US); Aditya Telidevara, Aurora, IL (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 214 days.

(21) Appl. No.: 15/601,827

(22) Filed: May 22, 2017

(65) Prior Publication Data
US 2018/0337993 A1 Nov. 22, 2018

(51) Int. Cl.
*H04L 29/08* (2006.01)
*G06F 16/27* (2019.01)
*H04L 29/06* (2006.01)

(52) U.S. Cl.
CPC ........ *H04L 67/1097* (2013.01); *G06F 16/27* (2019.01); *H04L 69/14* (2013.01); *H04L 67/1095* (2013.01)

(58) Field of Classification Search
CPC . G06F 16/27; H04L 67/1095; H04L 67/1097; H04L 69/14
See application file for complete search history.

(56) References Cited

U.S. PATENT DOCUMENTS

| 2007/0083617 A1* | 4/2007 | Chakrabarti ........ H04L 65/4084 709/218 |
| 2008/0208843 A1 | 8/2008 | Nagasawa |
| 2012/0233293 A1 | 9/2012 | Barton et al. |

(Continued)

OTHER PUBLICATIONS

Niazi, et al., "HopsFS: Scaling Hierarchical File System Metadata Using New SQL Databases", In proceedings of the 15th USENIX Conference on File and Storage Technologies, Published on: Feb. 27, 2017, 17 pages.

*Primary Examiner* — Irete F Ehichioya
*Assistant Examiner* — Xiaoqin Hu
(74) *Attorney, Agent, or Firm* — Workman Nydegger

(57) ABSTRACT

Sharding a data unit across storage locations (e.g., data centers, clusters, accounts, and so forth). For each location, the multi-link traffic constraints in data channeling with the storage location are identified. For instance, for a given data channel leading to and/or from a storage location, there may be multiple links. Each link may have its own constraints (e.g., in throughput and/or storage). Policy may consider the sharding of files in a manner that honors the constraints. The policy may also be set so that all portions of the shards may be timely accessed in parallel. When sharding, the policy is applied in order to identify initial placement of the computing data unit across the multiple storage locations. Furthermore, the policy may be consulted to determine which storage location to access the shard from and/or which channel to use to access the shard from a given location.

22 Claims, 5 Drawing Sheets

(56) References Cited

U.S. PATENT DOCUMENTS

| | | | |
|---|---|---|---|
| 2012/0259889 A1 | 10/2012 | Dinker et al. | |
| 2014/0046908 A1* | 2/2014 | Patiejunas | G06F 16/113 |
| | | | 707/687 |
| 2014/0289185 A1* | 9/2014 | Lindblad | G06F 16/278 |
| | | | 707/608 |
| 2015/0347553 A1 | 12/2015 | Aizman et al. | |
| 2016/0011901 A1* | 1/2016 | Hurwitz | G06F 9/4843 |
| | | | 718/101 |
| 2016/0034549 A1 | 2/2016 | Kesselman | |
| 2016/0044108 A1 | 2/2016 | Vermeulen et al. | |
| 2016/0048698 A1 | 2/2016 | Sahu et al. | |
| 2016/0241577 A1* | 8/2016 | Johnson | G06F 16/278 |
| 2016/0359708 A1 | 12/2016 | Gandham et al. | |
| 2017/0235609 A1* | 8/2017 | Wires | G06F 9/5016 |
| | | | 718/104 |
| 2018/0205790 A1* | 7/2018 | Mercian | H04L 67/1097 |

\* cited by examiner

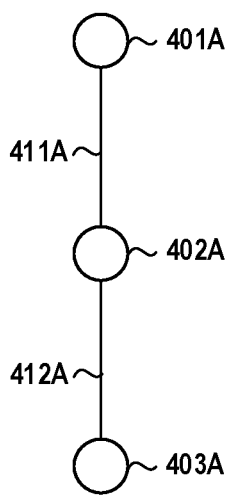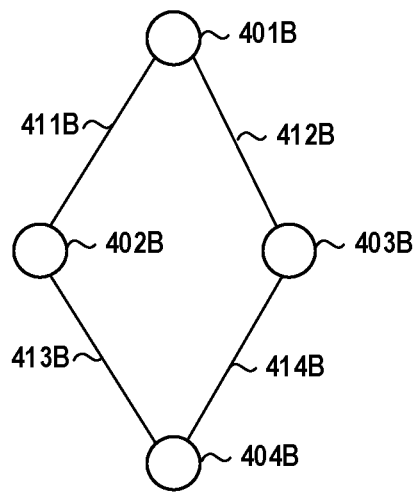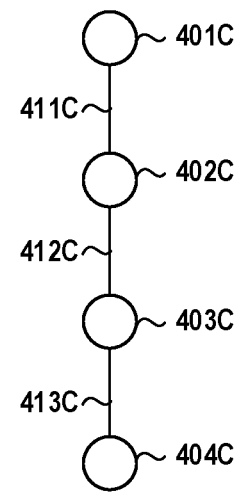
*Figure 4A*  *Figure 4B*  *Figure 4C*

SHARDING OVER MULTI-LINK DATA CHANNELS

BACKGROUND

Computing systems and associated networks have greatly revolutionized our world ushering in what is now commonly called the "information age". Efficient and effective storage of data is thus essential to reading, writing, persisting, and evaluating data. Often a file simply cannot fit onto a single storage device. In that case, the file is sharded (i.e., divided into parts) with each part (or shard) stored on a different storage device. This sharding process also helps to have parallel access to different shards of the file. Thus, fast data transfer enabled by parallel access is also a significant benefit of file sharding. Previous sharding technologies tend to address relatively uniform capacity constraints, such as throughput. For instance, a file might be sharded across similar hard drives. In high performance computing, a file might be sharded across specially designed networks in which throughput is designed to be uniform, regardless of the storage node.

As cloud computing services have developed, so too have storage services. A customer that establishes an account with a storage service may be guaranteed by a customer service agreement to have access to certain quantities of storage and/or certain I/O bandwidths. Of course, storage services hide from view the physical devices that are used to provide the storage on an account. Originally, such storage services were designed to simply store user data, such as documents, photographs, videos, music, and so forth.

The cloud is also able to access massive quantities of processing resources. Thus, complex data mining and analytics technologies have been developed. Such data mining or analytics often use as input massive quantities of data. Accordingly, storage services have become increasingly used as storage for massive amounts of raw data upon which analysis or data mining is performed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a method for sharding a computing data unit (such as a file) across multiple storage locations (e.g., data centers, clusters, accounts, and so forth). For each of multiple storage locations, the sharding system identifies multi-link traffic constraints in data channeling with the storage location. For instance, for a given data channel leading to and/or from a storage location, there may be multiple links. Each link may have its own constraints (e.g., in throughput and/or storage). A link may be a communication link or may even be a communication endpoint at which storage occurs.

For instance, some links may have constraints that are imposed by physical limits. As an example, some network channels are only capable of transmitting or receiving at certain bit rates. Some links may be limited to logical constraints, such as when policy is enforced on a link. This logical constraint might occur if an application or customer is to share the available physically possible storage capabilities (e.g., storage size and/or throughput) with multiple other applications and/or customers. In that case, to ensure that one application or customer does not impact another, policy enforces sufficient sharing so as to maximize the technical benefit that each application and/or customer receives, and/or to honor technical guarantees provided to the application and/or customer.

Policy may consider the sharding of files in a manner that honors the constraints, thereby avoiding the technical problems (e.g., network inefficiency, impact on other applications, etc.) that can be caused by a service throttling I/O if I/O exceeds certain levels. The policy may also be set so that all portions of the shards may be timely accessed in parallel. When sharding, the policy is applied in order to identify initial placement of the computing data unit across the multiple storage locations. Furthermore, the policy may be consulted to determine which storage location (in the case of multiple copies of the shard existing) to access the shard from and/or which channel to use to access the shard from a given location. Thus, efficient constraint-aware sharding of a computing data unit may be accomplished. Furthermore, the shards may be accessed in a manner that is likewise optimized towards efficient access given the constraints at access time.

The constraints that exist on any given one of the links in the multi-link channel may change over time, perhaps even rapidly. For instance, a link may be inoperative at any moment. The sharding system may keep track of these dynamically changing constraints, thereby responding appropriately to change in data channels and constraints of data links that may be used to access storage locations.

Thus, the sharding system may operate to shard storage locations that do not have uniform constraints, and are outside the control of the sharding system. For instance, the sharding system may shard to storage services. Even so, the sharding system honors constraints, thereby avoiding or mitigating technical penalties (e.g., reduced access speed, adverse impact on other applications, and so forth) that can sometimes apply when attempting to operate at too close to, or exceeding, those constraints.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A through 4C illustrate multiple examples of multi-link data channels that may be used to communicate shards to and from various storage locations.

DETAILED DESCRIPTION

Figure 1:
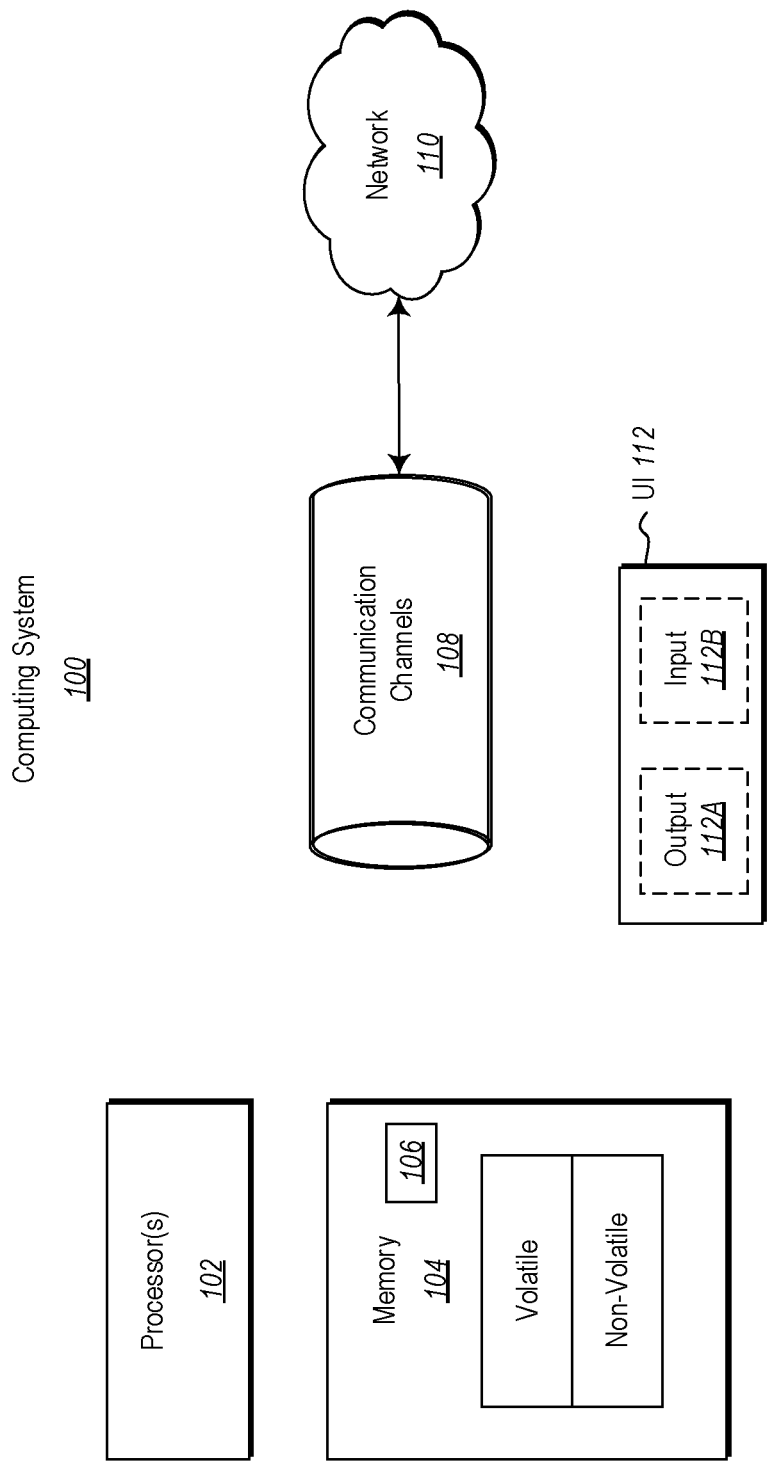
FIG. 1 illustrates an example computer system in which the principles described herein may be employed.

At least some embodiments described herein relate to a method for sharding a computing data unit (such as a file) across multiple storage locations (e.g., data centers, clusters, accounts, and so forth). Such storage locations may be local and/or remote from each other. For each of multiple storage locations, the sharding system identifies multi-link traffic constraints in data channeling with the storage location. For instance, for a given data channel leading to and/or from a storage location, there may be multiple links. Each link may have its own traffic constraints (e.g., in the form of a throughput constraint and/or a storage constraint). A link may be a communication link or may even be a communication endpoint at which storage occurs.

For instance, some links may have constraints that are imposed by physical limits. As an example, some network channels are only capable of transmitting or receiving at certain bit rates, and thus this represents a hard limit of the throughput. As another example, a storage device may have a hard limit on the amount of storage that it can physically store.

Some links may be limited by logical constraints (or soft limits), such as when sharing policy is enforced on a link. This logical constraint might occur if an application or customer is to share the available physically possible storage capabilities (e.g., storage size and/or throughput) with multiple other applications and/or customers. In that case, to ensure that one application or customer does not impact another, sharing policy enforces sufficient sharing so as to maximize the technical benefit that each application and/or customer receives, and/or to honor technical guarantees provided to the application and/or customer.

In some cases, if the application or consumer does not honor a logical throughput constraint, that application's or consumer's throughput may be throttled downward. This throttling may seem punitive, as enforcing sharing policy might take some time to allow the experienced throughput to recover even close to the logical throughput constraint. The application might deduce such a logical throughput constraint by monitoring over time when throttling occurs.

Policy may consider the sharding of files (e.g., the number of shards to segment the file into and/or the size of all or each shard) in a manner that honors the constraints, thereby avoiding the technical problems (e.g., network inefficiency, impact on other applications, punitive throttling) that can be caused by a service throttling I/O if I/O exceeds certain levels. The policy may also be set so that all portions of the shards may be timely accessed in parallel, thereby roughly evening out the time required to write (and perhaps subsequently read) the file as a whole.

When sharding, the policy is applied in order to identify initial placement of the computing data unit across the multiple storage locations. Furthermore, the policy may be consulted to determine which storage location (in the case of multiple copies of the shard existing) to access the shard from and/or which channel to use to access the shard from a given location. Multiple copies of a shard may exist (e.g., a copy of a shard may initially be placed in multiple locations). For instance, a shard can be replicated to another storage location. In some cases, after initial placement, the shard itself may be further sharded to multiple other storage locations. The reading operation may be aware of the location of the further sharded shards (or "subshards"), and consider their size, and the traffic constraints to those other storage locations when determining whether to access those subshards. Thus, efficient constraint-aware sharding of a computing data unit may be accomplished. Furthermore, the shards may be accessed in a manner that is likewise optimized towards efficient access given the constraints at access time.

The constraints that exist on any given one of the links in the multi-link channel may change over time, perhaps even rapidly. For instance, a link may be inoperative at any moment. The sharding system may keep track of these dynamically changing constraints, thereby responding appropriately to changes in data channels and constraints of data links that may be used to access storage locations.

Thus, the sharding system may operate to shard to storage locations that do not have uniform constraints, and are outside the control of the sharding system. For instance, the sharding system may shard to storage services. Even so, the sharding system honors constraints, thereby avoiding or mitigating technical penalties (e.g., reduced access speed, adverse impact on other applications, and so forth) that can sometimes apply when attempting to operate at too close to, or exceeding, those constraints.

Because the principles described herein operate in the context of a computing system, a computing system will be described with respect to FIG. 1. Then, the principles of sharding while honoring constraints in complex data channels (e.g., multi-link data channels) will then be described with respect to FIGS. 2 through 5.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
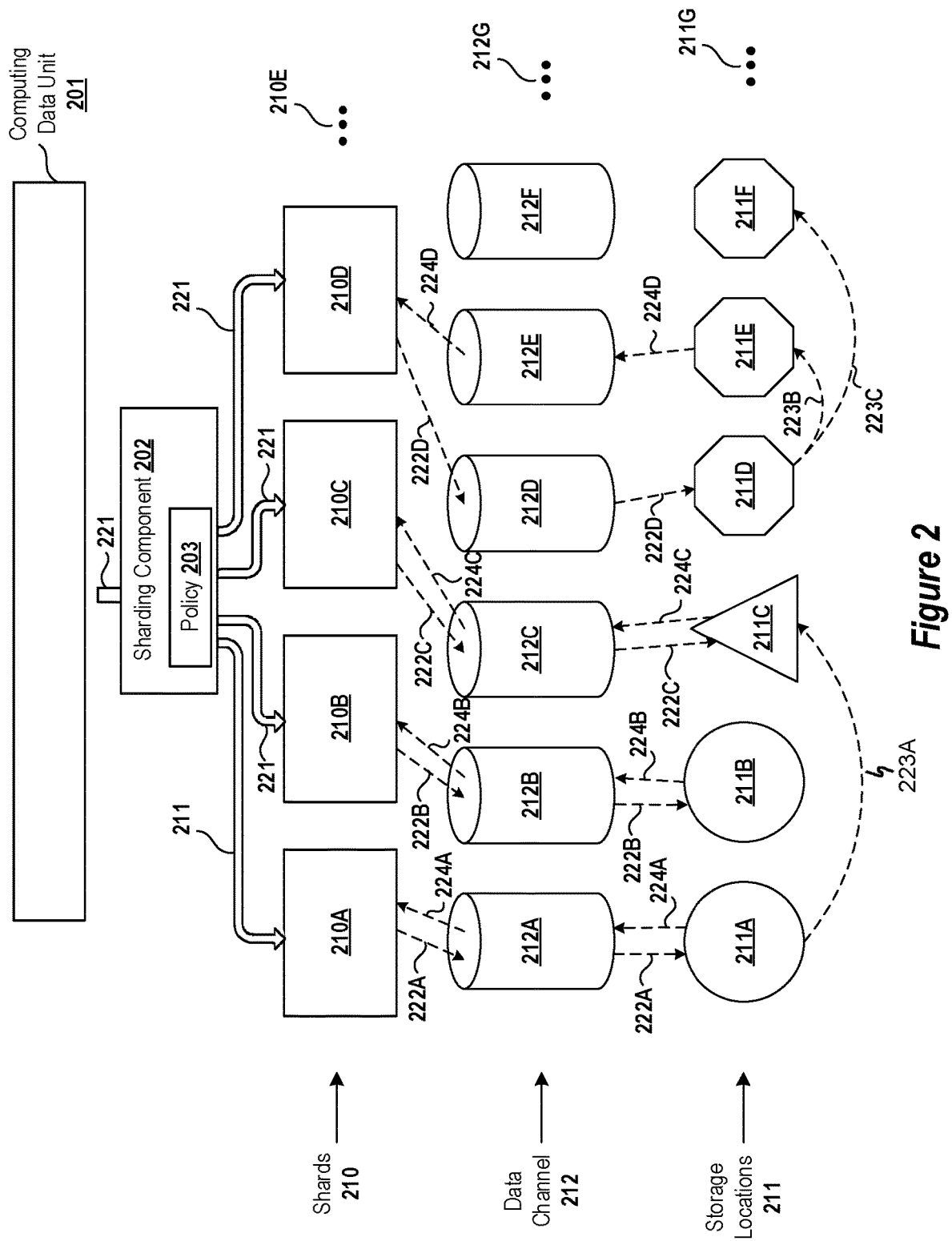
FIG. 2 illustrates an environment in which a computing data unit is sharded and the various shards are stored at various storage locations in accordance with a sharding policy.

FIG. 2 illustrates an environment 200 in which sharding of a computing data unit occurs. The computing data unit 201 is a unit of data that is identified by a computing system. For instance, a computing data unit 201 might be a file, in which case, the file is recognized by a file system of a computing system (such as the computing system 100 of FIG. 1). The computing data unit 201 might be a table in which case the table is recognized by a database application running on the computing system. Alternatively, the computing data unit may be a collection of other computing data units. For instance, the computing data unit might be a folder containing one or more files or subfolders. The computing data unit might also be a collection of related tables, or perhaps even an entire relational database. The computing data unit might also be unstructured data that is identified as a single unit to the computing system (such as is often the case in big data systems).

The computing data unit 201 is provided to a sharding component 202, which operates to perform sharding in accordance with the principles described herein. This is all represented by the multi-headed arrow 221 of FIG. 2. For instance, sharding of the computing data unit 201 might be performed in accordance with the method 300 of FIG. 3, which illustrates a flowchart of a method 300 for sharding a computing data unit across multiple storage locations. The sharding component 202 might be, for instance, an example of the executable component 106 of FIG. 1, when run on the computing system 100.

The sharding component 202 shards the computing data unit 201 into shards which are referred to collectively as "shards 210". In the illustrated embodiment, the computing data unit 201 is split into shards 210A through 210D as also represented by the arrow 221. The ellipsis 210E represents that the computing data unit 201 may be split into any number of shards. The shards may each be the same size or they may be different sizes. In accordance with the principles described herein, the computing data unit 201 is sharded in accordance with a policy 203.

FIG. 2 also illustrates storage locations 211 that may be used in order to store the various shards. In the illustrated embodiment, there are six storage locations 211A through 211F illustrated and that may be selected to store a shard of the computing data unit. The ellipses 211G represents that the principles described herein operate regardless of the number of possible storage locations to which the shards may be stored. Each of the storage locations 211 has a corresponding data channel 212 over which the shard may be communicated. For instance, data channels 212A through 212F may be used to read the shard from and/or write the shard to respective storage locations 211A through 211F. Again, the ellipses 212G represents that that there may be as many data channels as there are storage locations.

The storage locations 211 are illustrated as having different shapes, which symbolizes that the nature of the storage locations 211 may be different. For instance, the storage locations might be a logical storage location (such as a storage account on a storage service), or may be a physical storage location (such as a datacenter, or portion thereof, such as a storage node or cluster of storage nodes). For instance, storage locations 211A and 211B are illustrated as circles. Perhaps this represents that the storage locations 211A and 211B are storage accounts in a storage service of a cloud computing environment. The storage location 211C is illustrated as being a triangle, perhaps representing that this storage location 211C is a different kind of storage location (such as perhaps a Storage Area Network). The storage locations 211D, 211E, and 211F, are octagonal, representing perhaps yet another type of storage location such as a datacenter.

Figure 3:
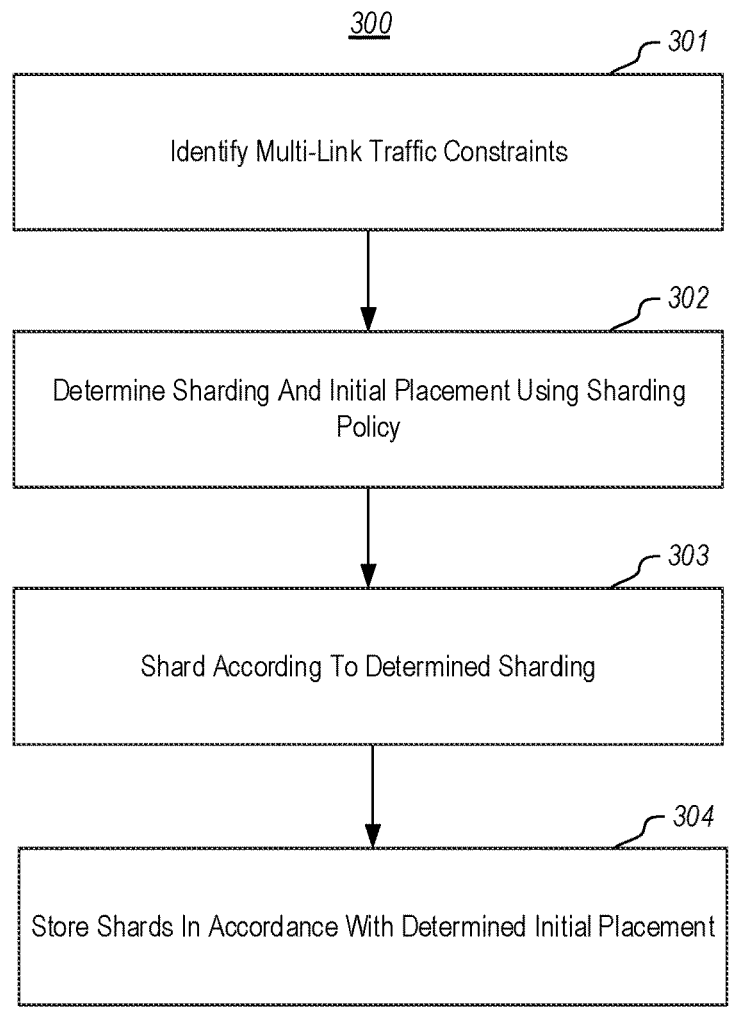
FIG. 3 illustrates a flowchart of a method for sharding a computing data unit across multiple storage locations.

FIG. 3 illustrates a flowchart of a method 300 for sharding a computing data unit across multiple storage locations. The method 300 may be performed by, for instance, the sharding component 202 of FIG. 2, in the environment 200 of FIG. 2. Accordingly, the method 300 of FIG. 3 will be described with frequent reference to the environment 200 of FIG. 2.

For each of multiple storage locations, multi-link traffic constraints are identified in data channeling with the storage location (act 301). For instance, in FIG. 2, each of the data channels 212 may have multiple links, each link having its own traffic constraints. Thus, while the data channels 212 are symbolically represented as simple tubes, they each represent complex data channels in which there are multiple links. In some embodiments, there may be an opportunity to create new storage locations. For instance, the sharding component may create new storage accounts at a storage service. In that case, each newly created storage account may be considered as a storage location to which shards may be stored. Thus, when considering the traffic constraints of each storage location, the traffic constraints of existing, and potentially new, storage locations may be considered.

FIGS. 4A through 4C illustrate various examples of multi-link data channels. For instance, FIG. 4A illustrates two serial links 411A and 412A. Link 411A connects node 401A to node 402A. Link 412A connects node 402A and node 403A. An example of a constraint that might be applied to each link includes a throughput constraint in terms of bits per second. For instance, link 411A might have a higher throughput constraint than link 412A. This might mean that the multi-link channel 400A may be considered to have a constraint equal to its lowest bandwidth link (i.e., the throughput constraint of link 412A).

The link constraints might alternatively be different in forms. For instance, link 411A might include a throughput constraint, whereas link 412A might include a storage capacity constraint (also referred to herein as a "storage constraint"). In that case, the multi-link constraint may be a compound constraint having multiple constraint dimensions including bits per second (for throughput constraints) and/or bytes (for storage constraints). The links might be logical or physical. For instance, link 411A might be a network link that is dedicated for use by the sharding component 202, in which case the throughput might be limited only by the physical capacity of the network itself, thus being a hard throughput constraint. On the other hand, the link 411A might include a throttling constraint in which the sharing policy of a service limits the utilization of the link 411A to a specified threshold, and throttles attempts to use more than the specified threshold. As another example of a logical constraint, the link 412A might be a storage service account, in which case perhaps the storage capacity (and/or the bandwidth) is artificially constrained so as to prevent collision with storage of other tenants of the service.

FIGS. 4B and 4C simply illustrate that the multi-link channels may take any of a variety of forms. For instance, FIG. 4B shows a multi-link channel in which there is a link 411B that couples the nodes 401B and 402B, a link 412B that couples the nodes 401B and 403B, a link 413B that couples the nodes 402B and 404B, and a link 414B that couples the nodes 403B and 404B. Here, there are multiple constituent channels that lead to the same storage location 404B. These constituent channels might each be selectable for storage to the storage location 404B. In that case, when selecting to store a shard over the data channel 400B, the policy may also be used to select the data channels to use to store a shard to the selected storage location. On the other hand, the channel may use each of the two channels to write and read the shard in parallel, for higher throughputs. FIG. 4C illustrates a series of three links 411C, 412C and 413C that lead from a node 401C to a node 404C (via nodes 402C and 403C).

The constraint of any given link in a multi-link data channel may change over time, and perhaps frequently change. For instance, the availability of some links may be quite transient, and depend on a variety of dynamically changing factors, such as the utilization of the link by other applications, weather conditions, maintenance, and so forth. The act 301 encompasses tracking any dynamically changing constraints as circumstances change. Furthermore, the act 301 may also encompass historical constraints (such as the average of a particular constraint).

The constraints of the multi-link data channel (e.g., the current constraint and/or the historical constraint) are then compared with the sharding policy to determine sharding (e.g., shard size and/or number of shards) and initial placement of shards of the computing data unit across multiple storage locations (act 302). The sharding policy honors traffic constraints in data channeling with multiple storage locations. As an example, suppose that a first multi-link data channel has no constraints, but has a bandwidth that averages twice that over a second multi-link data channel that has a storage constraint of one Terabyte (TB). In that case, a shard that is two TB might be stored over the first multi-link data channel, and a shard that is one TB might be stored over the second multi-link data channel. Both shards would then be written in parallel in about the same amount of time. As apparent from this description, the policy may be used to determine how the computing data unit is to be sharded, as well as where those shards are to be stored. When determining initial placement, a single shard may be replicated in multiple storage locations, although not required.

The shards are then created according to the determined sharding (act 303) and caused to be stored across the multiple locations in accordance with the determined initial placement (act 304). For instance, in the illustrated example of FIG. 2, shard 210A is initially stored to the storage location 211A using the data channel 212A as represented by arrow 222A, shard 210B is initially stored to the storage location 211B using the data channel 212B as represented by arrow 222B, shard 210C is initially stored to the storage location 211C using the data channel 212C as represented by arrow 222C, and shard 210D is initially stored to the storage location 211D using the data channel 212D as represented by arrow 222D. As previously mentioned, this sharding and initial placement may be made such that writing and/or reading may be done in parallel for each shard, so that the write or read is completed roughly at the same time for each shard. Furthermore, the writing and reading process may be adaptive with proper restraints, so as to avoid any throttling performed by sharing policy, and thereby avoiding punitive throttling.

Now that the shards have been written, a number of things may happen to each shard. As one example, the shard may be replicated from one storage location to another. For instance, in FIG. 2, as represented by arrow 223A, the shard 210A has been replicated from storage location 211A to storage location 211C. The sharding component 202 thus knows that there are two storage locations 211A and 211C from which the shard 210A may be read. As another example, the shard 210D has been replicated from storage location 211D to both storage locations 211E and 211F. Thus, the sharding component 202 knows that there are now three storage locations 211D, 211E, and 211F from which the shard 210D may be read. Examples of other things that may happen to a copy of a shard is that the shard may perhaps become corrupted, or the storage location in which a shard is located may no longer be available. Furthermore, a shard may be replicated via further sharding of the shard (e.g., into subshards) that are then stored across multiple storage locations. The sharding component 202 may keep track of any information that represents the locations from which the shards or subshards can be accessed, or can no longer be accessed.

Figure 5:
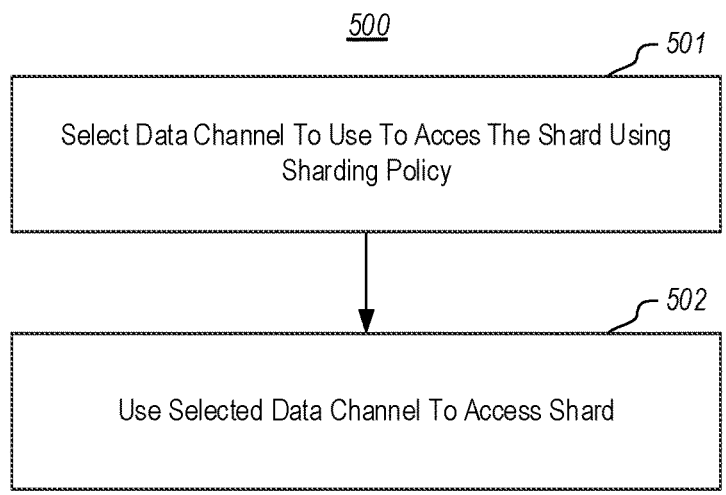
FIG. 5 illustrates a flowchart of a method for accessing at least one shard of a sharded computing data unit.

FIG. 5 illustrates a flowchart of a method 500 for accessing at least one shard of a sharded computing data unit. As an example, suppose that the sharding component 202 is to now access each of the shards 210A, 210B, 210C and 210D.

For any shards for which there is only one data channel that can be used to access the shard, those shards may simply be obtained over that data channel. For instance, as represented by arrow 224B, there is but one data channel 212B that may be used to access the shard 210B. Furthermore, as represented by arrow 224C, there is but one data channel 212C that may be used to access the shard 210C. However, the method 500 is performed for any shard for which there are multiple options for acquiring the shard. For instance, shard 210A might be acquired over data channel 212A or 212C; and shard 210D may be acquired over data channel 212D, 212E or 212F.

First, based on application of the policy (e.g., policy 203) to the multi-link traffic constraints of each of the available data channels, the sharding component 202 selects a data channel to use to access the shard (act 501). For instance, suppose that data channel 212A remains the best channel to use to access the shard 210A, despite that the shard 210A can also be accessed now over data channel 212C. Further suppose that data channel 212E is now the best channel to use to access the shard 210D, despite the shard 210D still available over the data channel 212D, and despite also newly being available over the data channel 212F. The determining of which channel is the best depends on the sharding policy 203 and also is based on the various constraints of the links leading to and from the storage location. As previously mentioned such constraints may include self-restraining constraints in throughput that avoid potentially punitive throttling by sharing policy.

In response, the sharding component 202 uses the selected data channel to access the corresponding shard (act 502). For instance, as represented by arrow 224A, the sharding component 202 accesses the shard from the storage location 211A over the data channel 212A. Also, as represented by arrow 224D, the sharding component 202 accesses the shard 210D from the storage location 211E over the data channel 212E. Again, the reading process may be adaptive with proper restraints, so as to avoid any throttling performed by the sharing policy, and to thereby avoiding punitive throttling.

Accordingly, the principles described herein intelligently select a best initial placement of shards of a computing data unit given the then existing and/or historical constraints of the various data channels leading to competing storage locations for the shard. Such constraints may be dynamically changing constraints, and may also factor in a component of history of the constraint over time. Also, when reading a shard, the policy allows for access of the shard from an appropriate storage location over an appropriate channel, given the then current constraints of that channel.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing system comprising:
   one or more processor(s); and
   one or more computer-readable hardware storage device(s) having stored thereon computer-executable instructions that are executable by the one or more processor(s) to cause the computing system to selectively distribute shards of a computing data unit across multiple storage locations by causing the computing system to:
   identify a multi-link traffic constraint for each data channel that is used to communicate with each storage location of the multiple storage locations, wherein identifying the multi-link traffic constraint includes:
     determining the data channel includes a first node serially connected to a second node via a first link and a third node serially connected to the second node via a second link, wherein the first link is associated with a throughput constraint and the second link is associated with a storage capacity constraint such that the multi-link traffic constraint is a compound constraint comprising multiple constraint dimensions including the throughput constraint and the storage capacity constraint; and
     for each of the first link and the second link, identifying both a current bandwidth constraint and a historical bandwidth constraint, the historical bandwidth constraint comprising an average bandwidth that the particular one link historically provided, wherein the multi-link traffic constraint further includes the current bandwidth constraint and the historical bandwidth constraint;
   compare the multi-link traffic constraint identified for each data channel to a sharding policy corresponding to the data channel and; divide the computing data unit into the shards based on the comparison;
   determine initial placements of the shards across the multiple storage locations based on the comparison, wherein the sharding policy is configured to honor the multi-link traffic constraint; and
   cause the shards of the computing data unit to be written to the multiple storage locations in accordance with the determined initial placements, wherein writing at least some of the shards to their corresponding storage locations is performed in parallel and is performed so that the writing is completed at approximately a same time for all of the at least some of the shards regardless of characteristics associated with said multiple storage locations.

2. The computing system in accordance with claim 1, wherein the shards comprise shards of at least two different sizes, and wherein a particular size of a shard is determined in accordance with the sharding policy.

3. The computing system in accordance with claim 1, wherein the initial placements comprise placing at least one of the shards replicated at different storage locations of the multiple storage locations.

4. The computing system in accordance with claim 1, each of at least some of the multiple storage locations comprising a storage account.

5. The computing system in accordance with claim 1, each of at least some of the multiple storage locations comprising a datacenter.

6. The computing system in accordance with claim 1, each of at least some of the multiple storage locations comprising clusters of storage nodes.

7. The computing system in accordance with claim 1, the computing data unit being a file.

8. The computing system in accordance with claim 1, the computing data unit being a database.

9. The computing system in accordance with claim 1, the computing data unit comprising a collection of other computing data units.

10. The computing system in accordance with claim 1, the multi-link traffic constraint comprising a dynamically changing constraint for at least one constraint dimension of the multiple constraint dimensions of the multi-link traffic constraint.

11. The computing system in accordance with claim 1, the multi-link traffic constraint further comprising a physical constraint.

12. The computing system in accordance with claim 1, the multi-link traffic constraint further comprising a throttling constraint.

13. The computing system in accordance with claim 1, wherein, for at least one of the multiple storage locations, there are multiple selectable data channels to use to store a shard to the at least one of the multiple storage locations.

14. The computing system in accordance with claim 13, wherein causing a particular shard of the computing data unit to be stored at the at least one of the multiple storage locations comprises:
   selecting the data channel to be used to store the particular shard based on application of the sharding policy; and
   in response to the selecting, using the data channel to store the particular shard at the at least one of the multiple storage locations.

15. The computing system in accordance with claim 1, wherein execution of the computer-executable instructions further causes the computing system to:
   access at least a portion of one of the written shards.

16. The computing system in accordance with claim 15, the accessing of the at least the portion of one of the written shards comprising:
   selecting the data channel to be used to access the at least the portion of one of the written shards based on application of the sharding policy; and
   in response to the selection of the data channel, using the data channel to access the at least the portion of one of the written shards.

17. The computing system in accordance with claim 15, the at least the portion of one of the written shards being an entire shard as initially placed.

18. The computing system in accordance with claim 15, the at least the portion of one of the written shards being a replicated shard or shard portion that was not initially placed at the corresponding storage location, but was replicated to the corresponding storage location since initial placement.

19. The computing system of claim 1, wherein execution of the computer-executable instructions further causes the computing system to:
   track first information representative of locations where the shards can be accessed; and
   track second information representative of locations where the shards used to be accessible but can no longer be accessed.

20. The computing system of claim 1, wherein the multi-link traffic constraint includes a self-restraining constraint in throughput that is structured to avoid potentially punitive throttling based on how the shards are to be distributed.

21. One or more hardware storage device(s) having stored thereon computer-executable instructions that are executable by one or more processor(s) of a computer system to cause the computer system to selectively distribute shards of a computing data unit across multiple storage locations by causing the computer system to at least:
   identify a multi-link traffic constraint for each data channel that is used to communicate with each storage location of the multiple storage locations, wherein identifying the multi-link traffic constraint includes:
      determining the data channel includes a first node serially connected to a second node via a first link and a third node serially connected to the second node via a second link, wherein the first link is associated with a throughput constraint and the second link is associated with a storage capacity constraint such that the multi-link traffic constraint is a compound constraint comprising multiple constraint dimensions including the throughput constraint and the storage capacity constraint; and
      for each of the first link and the second link, identifying both a current bandwidth constraint and a historical bandwidth constraint, the historical bandwidth constraint comprising an average bandwidth that the particular one link historically provided, wherein the multi-link traffic constraint further includes the current bandwidth constraint and the historical bandwidth constraint;
   compare the multi-link traffic constraint identified for each data channel to a sharding policy corresponding to the data channel and; divide the computing data unit into the shards based on the comparison;
   determine initial placements of the shards across the multiple storage locations based on the comparison, wherein the sharding policy is configured to honor the multi-link traffic constraint; and
   cause the shards of the computing data unit to be written to the multiple storage locations in accordance with the determined initial placements, wherein writing at least some of the shards to their corresponding storage locations is performed in parallel and is performed so that the writing is completed at approximately a same time for all of the at least some of the shards regardless of characteristics associated with said multiple storage locations.

22. A method, which is implemented by a computer system, for selectively distributing shards of a computing data unit across multiple storage locations, the method comprising:
   identifying a multi-link traffic constraint for each data channel that is used to communicate with storage location of the multiple storage locations, wherein identifying the multi-link traffic constraint includes:
      determining the data channel includes a first node serially connected to a second node via a first link and a third node serially connected to the second node via a second link, wherein the first link is associated with a throughput constraint and the second link is associated with a storage capacity constraint such that the multi-link traffic constraint is a compound constraint comprising multiple constraint dimensions including the throughput constraint and the storage capacity constraint;
      for each of the first link and the second link, identifying both a current bandwidth constraint and a historical bandwidth constraint, the historical bandwidth constraint comprising an average bandwidth that the particular one link historically provided, wherein the multi-link traffic constraint further includes the current bandwidth constraint and the historical bandwidth constraint;
   comparing the multi-link traffic constraint identified for each data channel to a sharding policy corresponding to the data channel and dividing the computing data unit into the shards based on the comparison;
   determining initial placements of the shards across the multiple storage locations based on the comparison, wherein the sharding policy is configured to honor the multi-link traffic constraint; and causing the shards of the computing data unit to be written to the multiple storage locations in accordance with the determined initial placements, wherein writing at least some of the shards to their corresponding storage locations is performed in parallel and is performed so that the writing is completed at approximately a same time for all of the at least some of the shards regardless of characteristics associated with said multiple storage locations.

* * * * *